UNITED STATES PATENT OFFICE.

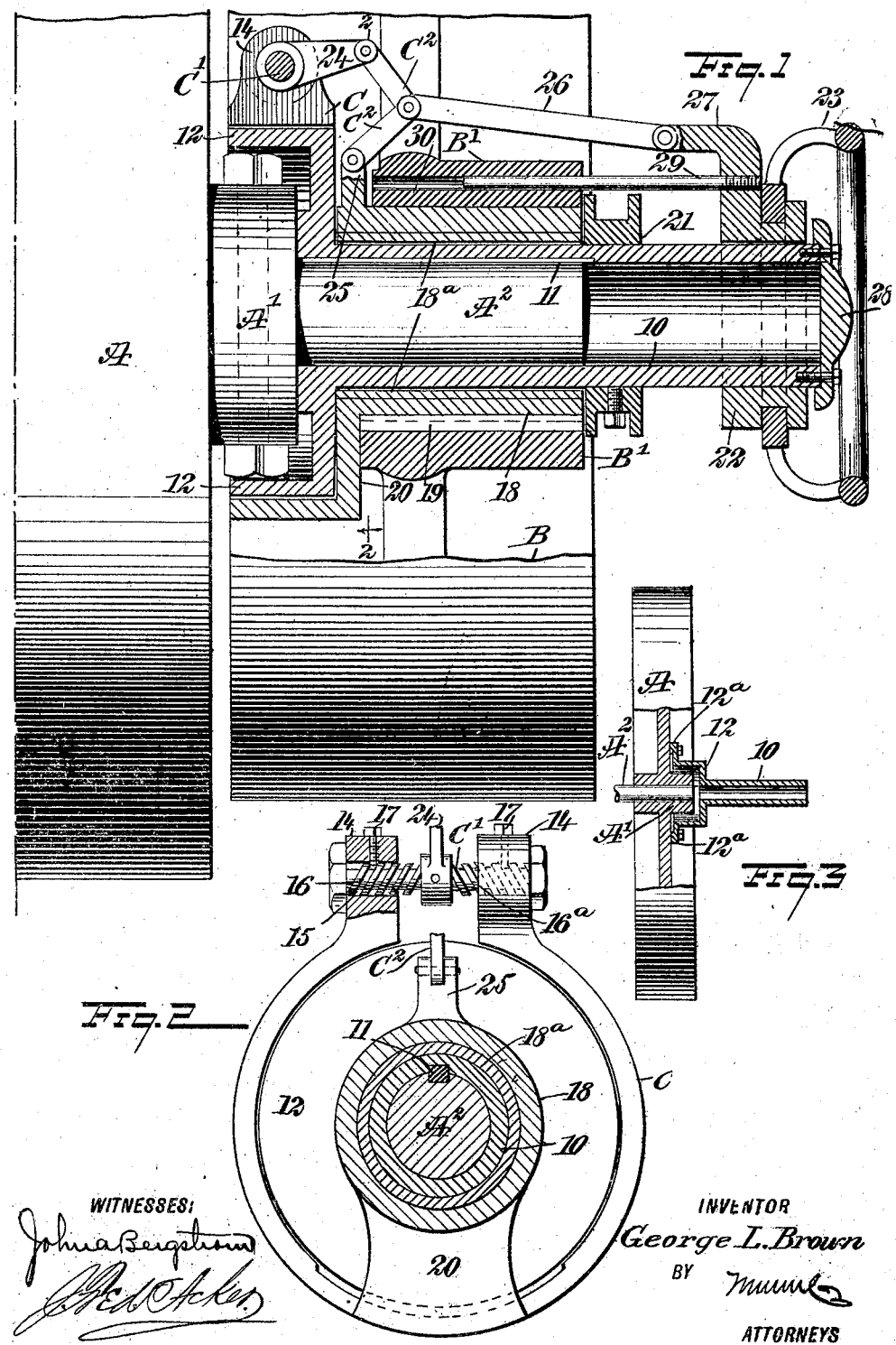

GEORGE LAWRENCE BROWN, OF ELYRIA, OHIO, ASSIGNOR TO THE BROWN CLUTCH COMPANY, OF ELYRIA, OHIO.

FRICTION-CLUTCH MECHANISM.

No. 853,676.  Specification of Letters Patent.  Patented May 14, 1907.

Application filed February 25, 1905. Serial No. 247,262.

*To all whom it may concern:*

Be it known that I, GEORGE LAWRENCE BROWN, a citizen of the United States, and a resident of Elyria, in the county of Lorain and State of Ohio, have invented a new and Improved Friction-Clutch Mechanism, of which the following is a full, clear, and exact description.

My invention relates to improvements in friction-clutch mechanism, and more particularly to such an appliance as is adapted for use upon gas engines; it being my object to produce a satisfactory clutch which shall meet the requirements obtaining in operating gas engines. Preferably the said appliance is one which shall fit upon the short shaft extending beyond the fly-wheel of a gas engine, and permits the engine to be started before the load is thrown on by operating the clutch. The requirements are such that all of the parts of the friction-clutch must lie upon one side of a given plane, represented by the fly-wheel of a gas engine, and shall at the same time be strong, serviceable and efficient in permitting the transmission of power to any connected machinery.

I may briefly describe my improvement in a preliminary way by stating that it comprises a sleeve secured to and extending a short distance beyond the end of the shaft, one end of which is enlarged to form a drum that surrounds the hub of the engine fly-wheel, on the other end a sleeve is mounted to which is secured the friction band and pulley wheel, and means for causing the friction band to engage and disengage the drum in order that the pulley may be connected and disconnected from the shaft so that the engine may be started without turning the driving mechanism.

The purpose of the invention is to provide a simple, effective and economic clutch pulley, which can be quickly and conveniently operated and which is capable of ready application to any engine, whether the shaft extends beyond the fly wheel for the reception of the pulley, or whether it be necessary to apply the device directly to the fly wheel.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a side elevation of the fly wheel of an engine and projecting end of the drive shaft, and a longitudinal section through the improved clutch pulley applied to the shaft; Fig. 2 is a transverse section taken substantially on the line 2—2 of Fig. 1; and Fig. 3 is a sectional peripheral view of the fly wheel and a longitudinal section through a portion of the device, the view being drawn on a smaller scale, and illustrates the application of the device directly to a fly.

A represents the fly wheel of an engine, A' the hub of the same and $A^2$ the projecting end of the drive shaft on which the fly wheel is mounted. A sleeve 10 is splined at 11 upon the projecting end of the shaft A and extends some distance out beyond the end of the shaft, while at the opposite end of the said sleeve 10 a hub 12 is formed, of sufficient exterior diameter to loosely fit over the hub A' of the fly wheel A, as is also shown in Fig. 1. The peripheral face of the sleeve hub 12 is circular and preferably smooth, and receives a clutch member C, which is in the form of a divided ring, as is illustrated in Fig. 2; and at each side of the opening 13 in the body of the clutch member C an ear 14 is produced, the two ears being parallel, and said ears are provided with corresponding apertures 15.

A threaded rod C' is passed through the openings 15 in said ears 14, the thread at one side of the center of the rod being a right-hand thread and that at the other side a left-hand thread, as is shown at 16 and $16^a$ in Fig. 2. Screws or bolts 17 are passed through the ears 14 into the openings 15 and extend into the grooved sections of the threads on said rod, so that by turning the threaded rod $C^2$ in one direction the ears 14 will be drawn together and the clutch member will be contracted into strong frictional engagement with the hub 12 so as to turn the driving pulley B, the hub B' whereof is connected with said clutch member C in a manner to be hereinafter described. When the threaded rod C' is turned in an opposite direction, the ears 14 are forced apart and the clutch member is taken out of frictional contact with the hub 12, and the drive-shaft may turn without moving the driving pulley B.

I do not wish to be understood, however, as necessarily limiting myself to the parts 17, against which the right and left-hand threaded member reacts, since other well known means may be used instead for securing the contraction and expansion of the clutch member.

A sleeve 18 provided with a Babbitt lining 18ª, is mounted to turn loosely on the main sleeve 10 connected with the drive-shaft, and the hub B' of the driving pulley is splined to the sleeve 18, as is shown in Fig. 1. The said sleeve 18 is connected by a web 20 with the clutch member C at a point opposite the opening 13 therein, as is shown in Figs. 1 and 2.

A collar 21 fixed upon the main sleeve 10 serves to hold the clutch sleeve 18 in position, and a second collar 22 is mounted to slide upon the main sleeve to and from the fixed collar 21. The sliding collar 22 may be operated through the medium of a connected hand wheel 23, or its equivalent, as for example a lever.

The threaded rod C' is operated by the movement of the sliding collar 22 in the following manner: An arm 24 is secured to the central portion of the rod C' and toggle levers C² are pivotally connected with said arm 24 and with a post 25 which extends from the clutch sleeve 18, and said toggle levers C² by means of a link 26 are pivotally connected with a finger 27 on the sliding collar 22 as is shown in Fig. 1; and when the clutch device is in position on the drive shaft A² the outer end of the main sleeve 10 is closed by a cap 28 or like device as is shown in Fig. 1. In order that the collar 22 may have guided movement on the main sleeve 10, a guide rod 29 is secured to the said collar beneath the finger 27, and the said guide rod 29 has sliding movement in a channel 30 produced in the hub, as is shown in Fig. 1.

In Fig. 3 I have illustrated the application of the main sleeve 10 directly to the fly wheel A, and when such an application of the device is made the hub 12 of the main sleeve 10 is provided with a flange 12ª, and the said flange is bolted or otherwise secured to the spokes or web portion of the fly wheel.

While my invention primarily is designed for use beyond the fly-wheel of a gas engine, it should not be understood that it is necessarily restricted thereto, inasmuch as the clutch mechanism herein disclosed may be suitably associated for transmitting power between various mechanisms.

Having thus described my invention, I claim as new, and desire to secure by Letters Patent,—

1. In clutch pulleys, a hub, an extension from the hub, a clutch member comprising a divided ring which encircles the hub, a sleeve connected to the clutch member and mounted on the hub extension, a pulley secured to the said sleeve, a device for contracting and expanding the divided ring, and means for operating the said device, which means are carried by the hub extension.

2. In clutch pulleys, a sleeve, a hub forming a portion of the sleeve, a divided ring mounted on the hub, ears extending from the ends of the ring, a screw having right and left-hand threads, mounted to turn in the said ears, pins carried by the ears, engaging the threads of the screw, a sleeve loosely mounted on the hub sleeve, a connection between the said sleeve and the said ring, a collar mounted to slide on the hub sleeve, and a toggle connection between the said collar, the said threaded rod and the ring sleeve.

3. In clutch pulleys, a main sleeve, a hub at one end of the said main sleeve, a collar mounted to slide on the opposite end of the hub, a divided ring mounted on the hub of the main sleeve, said divided ring being provided with ears at its ends, a rod having right and left-hand threads, the threaded portion of the rods being adapted to turn in said ears, pins carried by the ears, engaging the threads of the rod, a sleeve connected with said ring, which sleeve is mounted on the main sleeve, an extension from the ring sleeve, a crank arm extending from the threaded rod, and a toggle connection between the extension from the ring sleeve, the said crank arm and the sliding collar.

4. In clutch pulleys, a main sleeve having a hub at one end, a collar mounted to slide on the main sleeve, which collar is provided with a finger extending in direction of the hub, a divided ring encircling the said hub, a rod having right-and left-hand threads, the threaded portion of the rod being in engagement with the end portions of the ring, a crank arm extending from the said threaded rod, a sleeve mounted on the main sleeve and connected with said ring, a pulley connected with the ring sleeve, an extension from the ring sleeve, toggle levers connected with the said extension and with the crank arm on the threaded rod, and a link connection between the toggle levers and the finger of said sliding collar.

5. In friction clutches, a shaft and a band-wheel mounted thereon having an extension on said shaft, a brake-band about said wheel having a hub at one side thereof rotatably mounted on said extension and a pulley having a hub fastened upon the hub of the brake-band, in combination with means to tighten and loosen the brake-band comprising a right and left hand screw engaged in the ends of said band, a set of links and a connecting link, and a collar mounted on the said extension of the band-wheel.

6. In friction clutches, a fly-wheel and a shaft having its end projecting through to one side of said wheel, in combination with a band-wheel mounted on said end of the shaft and having a tubular extension sleeved on said end and projecting outward beyond the same, a brake-band about said band-wheel and having a hub loosely mounted on said extension, a pulley fixed upon said hub and means to tighten and loosen said brake-band slidably mounted in part upon the outer end of said extension in part upon the hub of the brake-band.

7. In a friction-clutch device, the combination with a rotatable shaft, of a band-wheel mounted thereon and provided with a lateral extension or sleeve, an encircling clutch-member positioned about said wheel provided with a sleeve-part rotatably mounted upon said extension, a pulley or wheel secured to the clutch-member, means for tightening and loosening said clutch-member, comprising a right and left hand screw mounted to open and close the encircling clutch-member, an actuating collar slidably mounted beyond the clutch mechanism, and connecting links uniting the same with the screw, substantially as set forth.

8. In a friction-clutch device, the combination with a rotatable shaft, of a band-wheel mounted thereon and provided with a lateral extension or sleeve, an encircling clutch-member positioned about said wheel provided with a sleeve-part rotatably mounted upon said extension, a pulley or wheel secured to the clutch-member, means for tightening and loosening said clutch-member, comprising a right and left hand screw mounted to open and close the encircling clutch-member, an actuating collar slidably mounted beyond the clutch mechanism, and two links forming a toggle-joint associated with the screw and connected with the actuating collar; the joint between said links being adapted to be forced past a vertical position to lock the clutch-member into engagement with the band-wheel, substantially as set forth.

9. In a friction-clutch device, the combination with a driven shaft, of a band-wheel mounted thereon and provided with a lateral extension or sleeve, an encircling clutch-member associated with said wheel and rotatably mounted upon said extension, a pulley or wheel operatively connected with said clutch-member, means for engaging the clutch-member with its associated band-wheel, and a rotatably mounted hand-wheel positioned beyond the clutch-mechanism, associated with said means and slidably mounted to move longitudinally with respect to the shaft, for actuating said clutch-mechanism, substantially as set forth.

10. In a clutch mechanism of the class described, the combination with a friction drum and sleeve adapted to be mounted beyond the fly-wheel or driven part, of a second sleeve mounted upon but rotatable with respect to the former, a pulley wheel and a friction member for engaging the drum, both carried by the latter sleeve, and means for causing the friction member to engage and disengage the drum, substantially as set forth.

In testimony whereof I have signed my name to this specification in the presence of two subscribing witnesses:

GEORGE LAWRENCE BROWN.

Witnesses:
LEWIS D. BOYNTON,
HARRY B. HECOCK.